US009615064B2

(12) United States Patent
Millar et al.

(10) Patent No.: US 9,615,064 B2
(45) Date of Patent: Apr. 4, 2017

(54) TRACKING MOVING OBJECTS USING A CAMERA NETWORK

(75) Inventors: Greg Millar, Coarsegold, CA (US); Farzin Aghdasi, Clovis, CA (US); Lei Wang, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 810 days.

(21) Appl. No.: 12/982,138

(22) Filed: Dec. 30, 2010

(65) Prior Publication Data
US 2012/0169882 A1    Jul. 5, 2012

(51) Int. Cl.
*H04N 7/18* (2006.01)
*G08B 13/196* (2006.01)

(52) U.S. Cl.
CPC ....... *H04N 7/181* (2013.01); *G08B 13/19608* (2013.01)

(58) Field of Classification Search
CPC . G08B 13/19608; G08B 13/196; H04N 7/181
USPC ......... 348/169, 214, 152, 143, 155, 172, 47, 348/144, 208, 269, 153, 158, 167, 159, 348/135, 701, 207.11; 382/190, 224, 165, 382/219, 218, 103
See application file for complete search history.

(56) References Cited

U.S. PATENT DOCUMENTS

| | | | |
|---|---|---|---|
| 6,084,982 | A | 7/2000 | Challapali |
| 6,359,647 | B1 | 3/2002 | Sengupta et al. |
| 6,404,455 | B1 | 6/2002 | Ito et al. |
| 6,665,004 | B1 * | 12/2003 | Paff .................. G08B 13/19645 348/156 |
| 6,724,421 | B1 * | 4/2004 | Glatt ............................ 348/154 |
| 6,812,835 | B2 | 11/2004 | Ito et al. |
| 7,242,423 | B2 * | 7/2007 | Lin ............... 348/169 |
| 7,280,673 | B2 | 10/2007 | Buehler et al. |
| 7,295,228 | B2 | 11/2007 | Roberts et al. |
| 7,336,297 | B2 * | 2/2008 | Ishigami et al. .............. 348/143 |

(Continued)

FOREIGN PATENT DOCUMENTS

| | | |
|---|---|---|
| CN | 101465955 A | 6/2009 |
| CN | 101563710 A | 10/2009 |

(Continued)

OTHER PUBLICATIONS

Non-Final Office Action; U.S. Appl. No. 12/982,601, filed Jun. 5, 2013.

(Continued)

*Primary Examiner* — Behrooz Senfi
(74) *Attorney, Agent, or Firm* — Hunter Clark PLLC

(57) ABSTRACT

Techniques are described for tracking moving objects using a plurality of security cameras. Multiple cameras may capture frames that contain images of a moving object. These images may be processed by the cameras to create metadata associated with the images of the objects. Frames of each camera's video feed and metadata may be transmitted to a host computer system. The host computer system may use the metadata received from each camera to determine whether the moving objects imaged by the cameras represent the same moving object. Based upon properties of the images of the objects described in the metadata received from each camera, the host computer system may select a preferable video feed containing images of the moving object for display to a user.

23 Claims, 8 Drawing Sheets

(56) References Cited

U.S. PATENT DOCUMENTS

| | | | |
|---|---|---|---|
| 7,480,414 B2 | 1/2009 | Brown et al. | |
| 7,583,275 B2 | 9/2009 | Neumann et al. | |
| 8,472,714 B2* | 6/2013 | Brogren | G06K 9/00369 382/100 |
| 2004/0252194 A1* | 12/2004 | Lin | G08B 13/19645 348/169 |
| 2005/0036659 A1* | 2/2005 | Talmon | G06K 9/00 382/103 |
| 2005/0093977 A1* | 5/2005 | Kikuchi | G06T 7/20 348/157 |
| 2005/0220361 A1* | 10/2005 | Yamasaki | 382/284 |
| 2006/0007308 A1* | 1/2006 | Ide et al. | 348/143 |
| 2006/0104488 A1 | 5/2006 | Bazakos et al. | |
| 2006/0204077 A1 | 9/2006 | Lim et al. | |
| 2006/0233436 A1* | 10/2006 | Ma et al. | 382/154 |
| 2006/0284976 A1 | 12/2006 | Girgensohn et al. | |
| 2007/0064107 A1* | 3/2007 | Aggarwal et al. | 348/143 |
| 2008/0219509 A1 | 9/2008 | White et al. | |
| 2009/0087096 A1 | 4/2009 | Eaton et al. | |
| 2009/0192990 A1* | 7/2009 | Chin | G06F 17/3079 |
| 2009/0195382 A1 | 8/2009 | Hall | |
| 2009/0303329 A1* | 12/2009 | Morisaki | 348/159 |
| 2010/0002082 A1* | 1/2010 | Buehler | G08B 13/19693 348/159 |
| 2010/0111370 A1 | 5/2010 | Black et al. | |
| 2010/0157064 A1* | 6/2010 | Cheng | G06K 9/00771 348/169 |
| 2010/0166325 A1 | 7/2010 | Sengamedu et al. | |
| 2010/0177969 A1 | 7/2010 | Huang et al. | |
| 2010/0201787 A1* | 8/2010 | Zehavi | G01S 5/16 348/48 |
| 2010/0208063 A1 | 8/2010 | Lee et al. | |
| 2010/0277586 A1 | 11/2010 | Ying et al. | |
| 2011/0044536 A1 | 2/2011 | Cobb et al. | |
| 2011/0063445 A1 | 3/2011 | Chew | |
| 2011/0157368 A1* | 6/2011 | Jo | 348/159 |
| 2011/0187703 A1* | 8/2011 | Patwardhan et al. | 345/419 |
| 2012/0038776 A1* | 2/2012 | Ahiska et al. | 348/159 |
| 2012/0133773 A1* | 5/2012 | Brogren | G06K 9/00369 348/159 |
| 2012/0140066 A1* | 6/2012 | Lin | 348/143 |
| 2012/0206605 A1* | 8/2012 | Buehler et al. | 348/159 |

FOREIGN PATENT DOCUMENTS

| | | |
|---|---|---|
| CN | 101739686 A | 6/2010 |
| CN | 101840422 A | 9/2010 |
| EP | 1862941 A2 | 12/2007 |
| WO | 2005099270 A2 | 10/2005 |
| WO | 2007094802 A2 | 8/2007 |
| WO | 2009017687 A1 | 2/2009 |
| WO | 2009111498 A2 | 9/2009 |

OTHER PUBLICATIONS

Non-Final Office Action; U.S. Appl. No. 12/982,601, filed Dec. 5, 2012.
(Related Matter) International Search Report and Written Opinion; PCT/US2011/067732; Aug. 9, 2012.
International Search Report and Written Opinion; PCT/US2011/066956; Sep. 19, 2012.
Final Office Action; U.S. Appl. No. 12/982,601, filed Nov. 15, 2013.
Non-Final Office Action; U.S. Appl. No. 12/982,601, filed Apr. 14, 2014.
International Preliminary Report on Patentability dated Jul. 2, 2013 for International Application No. PCT/US2011/067732, 4 pgs.
International Preliminary Report on Patentability dated Jul. 2, 2013 for International Application No. PCT/US2011/066956, 6 pgs.
Final Office Action; U.S. Appl. No. 12/982,601; Sep. 5, 2014, 59 pgs.
State Intellectual Property Office of the P.R.C. (SIPO) 1st Office Action for Application No. 201180062817.6 dated Nov. 4, 2014, 3 pgs.
IP Australia 1st Examination Report for Application No. 2011352408, dated Nov. 24, 2014, 3 pgs.
Non-Final Office Action; U.S. Appl. No. 12/982,601 (related case); Mar. 24, 2015, 56 pgs.
IP Australia 1st Examination Report for Application No. 2011352157, dated Aug. 3, 2015, 3 pgs.
SIPO 2nd Office Action and Search Report for Application No. 201180062817.6 dated 2015, Aug. 24, 12 pgs. (Official English Translation from EPO Global Dossier).
State Intellectual Property Office of the P.R.C. (SIPO) 1st Office Action and Search Report for Application No. 201180063458 dated Sep. 21, 2015, 10 pgs.
Supplementary Partial European Search Report dated Nov. 11, 2015 for European Application No. EP11853924, Munich, Germany, 8 pgs.
Haering, N., Venetianer, P. L., & Lipton, A. (Oct. 2008). The evolution of video surveillance: an overview. Machine Vision and Applications, 19(5), 279-290.
State Intellectual Property Office of the P.R.C. (SIPO) 2nd Office Action (Official Translation) for Application No. 201180062817.6 dated 2015, Aug. 24, 3 pgs.
IP Australia Notice of Acceptance for Application No. 2011352408 (counterpart application), dated Oct. 27, 2015, 2 pgs.
IP Australia Notice of Acceptance for Application No. 2011352157 (related case), dated Dec. 22, 2015, 2 pgs.
State Intellectual Property Office of the P.R.C. (SIPO) 3rd Office Action (Official Translation) for Application No. 201180062817.6 dated 2016, Feb. 16, 3 pgs.
Extended European Search Report (European Search Report & European Search Opinion) dated Mar. 10, 2016 for European Application No. EP11853924.6, 18 pgs.
Bose, B., & Grimson, E. (Oct. 2003). Learning to use scene context for object classification in surveillance. Proceedings of the Joint IEEE International Workshop on Visual Surveillance and Performance Evaluation of Tracking and Surveillance (VS-PETS), 94-101.
Tian, Y. L., Lu, M., & Hampapur, A. (Jun. 20, 2005). Robust and efficient foreground analysis for real-time video surveillance. IEEE Computer Society Conference on Computer Vision and Pattern Recognition (CVPR'05), 1, 1182-1187. IEEE.
Tian, Y. L., Brown, L., Hampapur, A., Lu, M., Senior, A., & Shu, C. F. (Sep. 15, 2005). IBM smart surveillance system (S3): an open and extensible framework for event based surveillance. IEEE Conference on Advanced Video and Signal Based Surveillance (AVSS), 318-323. IEEE.
Tian, Y. L., Hampapur, A., Brown, L., Feris, R., Lu, M., Senior, A., . . . & Zhai, Y. (2009). Event Detection, Query, and Retrieval for Video Surveillance. In Z. Ma (Ed.), Artificial Intelligence for Maximizing Content Based Image Retrieval, 342-370. DOI: 10.4018/978-1-60566-174-2.ch015.
State Intellectual Property Office of the P.R.C. (SIPO) 2nd Office Action and Search Report for Application No. 201180063458 dated Apr. 22, 2016 (translation), 3 pgs.
State Intellectual Property Office of the P.R.C. (SIPO) 3rd Office Action and Search Report for Application No. 201180063458 dated Aug. 12, 2016 (translation), 3 pgs.
State Intellectual Property Office of the P.R.C. (SIPO) 4th Office Action and Search Report for Application No. 201180062817 dated Aug. 23, 2016 (translation), 13 pgs.
Extended European Search Report (Supplementary European Search Report & European Search Opinion) dated Sep. 28, 2016, for European Application No. EP11852618, 10 pgs.

\* cited by examiner

TRACKING MOVING OBJECTS USING A CAMERA NETWORK

CROSS REFERENCES

This Application is related to U.S. patent application Ser. No. 12/982,601, entitled "Searching Recorded Video" filed on Dec. 30, 2010, the entire disclosure of which is incorporated by reference for all purposes.

BACKGROUND

Security cameras are commonly used to monitor indoor and outdoor locations. Networks of security cameras may be used to monitor large areas. For example, dozens of cameras may be used to provide video feeds of sections of a college campus. Typically, if a user, such as a security guard, is monitoring the video feeds produced by the security cameras and he wishes to track an object, such as a suspicious-looking person walking across campus, the security guard would manually switch video feeds based on the movement of the suspicious person. If the suspicious person walked out of one camera's view, the security guard would identify another camera suitable to continue monitoring the suspicious person. This may entail the security guard studying a map that identifies the portions of campus covered by various security cameras. Once the next security camera to be used has been identified, the security guard may switch to viewing a video feed from that security camera to continue viewing the suspicious person.

SUMMARY

An example of a method for tracking an object with a plurality of cameras includes: capturing, using a first camera, a first set of frames, wherein the plurality of cameras comprises the first camera, the first set of frames comprises a first set of images of the object, and the first set of frames is captured from a first point of view; capturing, using a second camera, a second set of frames, wherein: the plurality of cameras comprises the second camera, the second set of frames comprises a second set of images of the object, and the second set of frames is captured from a second point of view; determining, using the first camera, a presence of the object in the first set of frames; linking, by the first camera, metadata to the presence of the object, wherein the metadata indicates at least one characteristic of the first set of images of the object; transmitting the metadata from the first camera to a computing system; and identifying, by the computing system, based at least in part on the metadata received from the first camera, that the second set of images captured by the second camera represents the same object as the object in the first set of images in the first set of frames.

An example of a system for identifying an object in frames captured by a plurality of cameras includes: the plurality of cameras, wherein the plurality of cameras comprises a first camera and a second camera, the first camera is configured to capture a first set of frames from a first point of view with a first field of view, the first camera is configured to identify a first set of images of a first object in the first set of frames, the first camera is configured to determine a first set of metadata associated with the first object in the first set of frames, the second camera is configured to capture a second set of frames from a second point of view with a second field of view, the second camera is configured to identify a second set of images of a second object in the second set of frames, and the second camera is configured to determine a second set of metadata associated with the second object in the second set of frames; and a host computer system configured to: receive the first set of metadata from the first camera, receive the second set of metadata from the second camera, receive the first set of frames from the first camera, receive the second set of frames from the second camera, and determine, based at least in part on the first set of metadata received from the first camera and the second set of metadata received from the second camera, that the first set of images of the first object and the second set of images of the second object represent the same object.

An example of an apparatus for tracking an object includes: a first means for capturing a first set of frames, wherein the first set of frames comprises a first set of images of an object, and the first set of frames is captured from a first point of view with a first field of view; a second means for capturing a second set of frames, wherein the second set of frames comprises a second set of images of the object, and the second set of frames is captured from a second point of view with a second field of view; a third means for identifying a presence of the object in the first set of frames; a fourth means for determining metadata associated with the first set of images of the object, wherein the metadata indicates at least one characteristic of the first set of images of the object; and a fifth means for identifying, based at least in part on the metadata, that the second set of images comprises the same object as the first set of images.

An example of a method for calibrating a PTZ (pan, tilt, and zoom) camera using a fixed camera includes: adjusting a pan and tilt of the PTZ camera such that a field of view of the PTZ camera overlaps a field of view of a fixed camera; receiving, by a computing system, a first set of coordinates associated with a first location in the field of view of the fixed camera; receiving, by the computing system, a second set of coordinates associated with the first location in the field of view of the PTZ camera; and calculating, by the computing system, a set of transform parameters, using the first set of coordinates associated with the first location in the field of view of the fixed camera and the second set of coordinates associated with the first location in the field of view of the PTZ camera.

DETAILED DESCRIPTION

Figure 1:
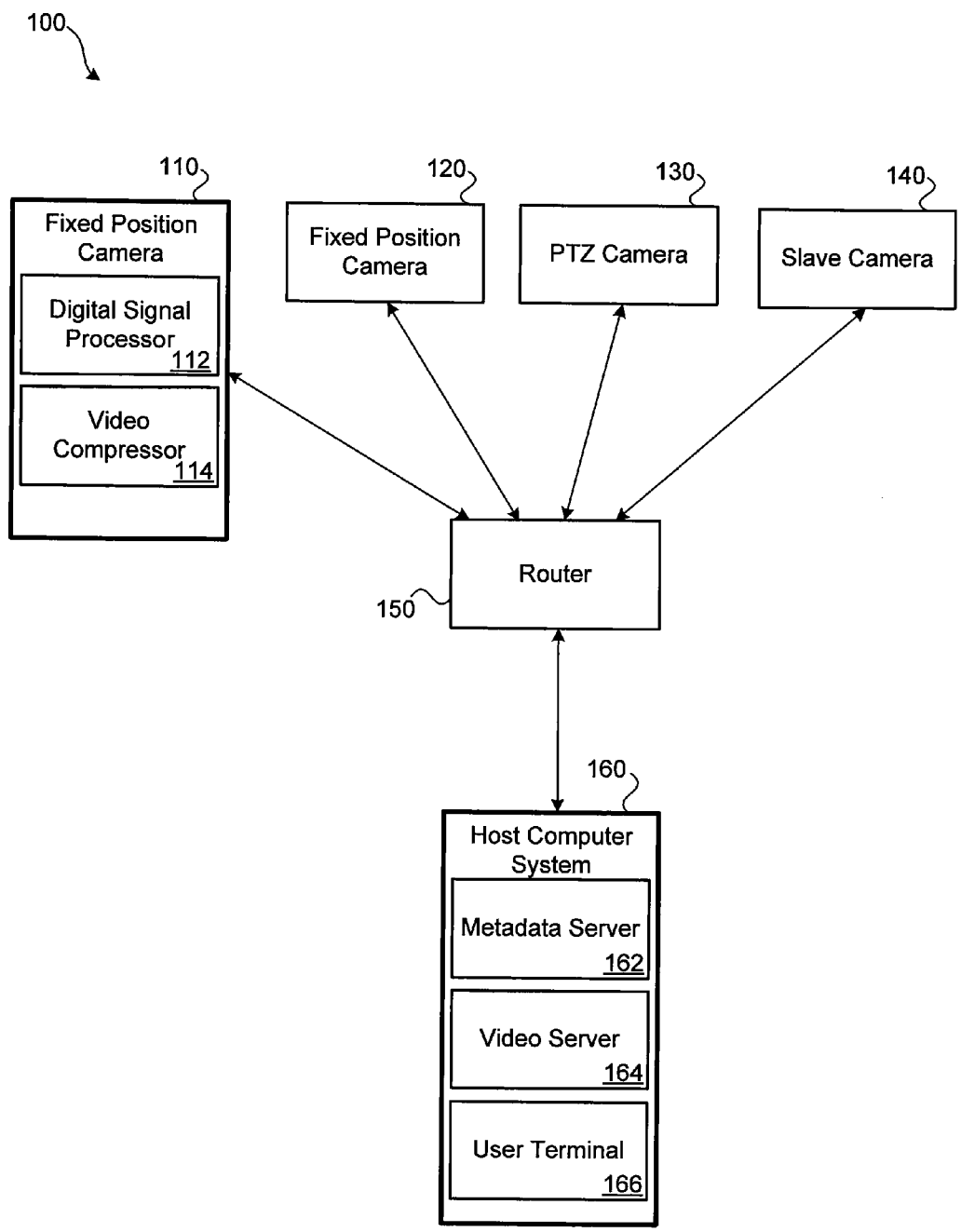
FIG. 1 illustrates a block diagram of an embodiment of a security camera network.

Techniques and systems described herein provide various mechanisms for tracking moving objects using multiple security cameras of a camera network. A moving object, such as a person, vehicle, or animal, can be tracked using multiple security cameras (referred to as "cameras" for short) without requiring a user, such as a security guard, to manually select a camera or video feed as the object moves among regions visible from different cameras. Therefore, the user is able to monitor a moving object using video feeds provided by multiple cameras without needing to manually switch the video feed being displayed. As the object moves, a host computer system evaluates whether images of objects appearing in the field of view of multiple cameras represent the same object. If the host computer system determines that these images represent the same object and the user has indicated that he desires to track the object, the host computer system selects a preferable video feed that contains the object based on predefined conditions for display to the user. As the object moves, the host computer system reevaluates which camera has the preferable view of the object and changes the video feed presented to the user when another video feed is determined to be the preferable video feed. Such an arrangement allows a user to view a moving object as it moves between fields of view of different cameras without having to manually select which camera's video feed to use.

Each camera in a camera network has an associated point of view and field of view. A point of view refers to the position and perspective from which a physical region is being viewed by a camera. A field of view refers to the physical region imaged in frames by the camera. A camera that contains a processor, such as a digital signal processor, can process frames to determine whether a moving object is present within its field of view. The camera associates metadata with images of the moving object (referred to as "object" for short). This metadata defines various characteristics of the object. For instance, the metadata can define the location of the object within the camera's field of view (in a 2-D coordinate system measured in pixels of the camera's CCD), the width of the image of the object (e.g., measured in pixels), the height of image of the object (e.g., measured in pixels), the direction the image of the object is moving, the speed of the image of the object, the color of the object, and/or a category of object. These are pieces of information that can be present in metadata associated with images of the object; other metadata is also possible. The category of object refers to a category, based on other characteristics of the object, that the object is determined to be within. For example, categories can include: humans, animals, cars, small trucks, large trucks, and/or SUVs. Metadata regarding events involving moving objects is also transmitted by the camera to the host computer system. Such event metadata includes: an object entering the field of view of the camera, an object leaving the field of view of the camera, the camera being sabotaged, the object remaining in the camera's field of view for greater than a threshold period of time (e.g., if a person is loitering in an area for greater than some threshold period of time), multiple moving objects merging (e.g., a running person jumps into a moving vehicle), a moving object splitting into multiple moving objects (e.g., a person gets out of a vehicle), an object entering an area of interest (e.g., a predefined area where the movement of objects is desired to be monitored), an object leaving a predefined zone, an object crossing a tripwire, an object moving in a direction matching a predefined forbidden direction for a zone or tripwire, object counting, object removal (e.g., when an object is still longer than a predefined period of time and its size is larger than a large portion of a predefined zone), object abandonment (e.g., when an object is still longer than a predefined period of time and its size is smaller than a large portion of a predefined zone), and a dwell timer (e.g., the object is still or moves very little in a predefined zone for longer than a specified dwell time).

Each camera transmits metadata associated with images of moving objects to a host computer system. Each camera also transmits frames of a video feed, possibly compressed, to the host computer system. Using the metadata received from multiple cameras, the host computer system determines whether images of moving objects that appear (either simultaneously or nonsimultaneously) in the fields of view of different cameras represent the same object. If a user specifies that this object is to be tracked, the host computer system displays to the user frames of the video feed from a camera determined to have a preferable view of the object. As the object moves, frames may be displayed from a video feed of a different camera if another camera is determined to have the preferable view. Therefore, once a user has selected an object to be tracked, the video feed displayed to the user may switch from one camera to another based on which camera is determined to have the preferable view of the object by the host computer system. Such tracking across multiple cameras' fields of view can be performed in real time, that is, as the object being tracked is substantially in the location displayed in the video feed. This tracking can also be performed using historical video feeds, referring to stored video feeds that represent movement of the object at some point in the past.

FIG. 1 illustrates a block diagram of a security camera network 100. Security camera network 100 includes: fixed position camera 110, fixed position camera 120, PTZ (Pan-Tilt-Zoom) camera 130, and slave camera 140. Security camera networks may have zero, one, or more than one of each type of camera. For example, a security camera network could include five fixed cameras and no other types of cameras. As another example, a security camera network could have three fixed position cameras, three PTZ cameras, and one slave camera.

Security camera network 100 also includes router 150. Fixed position camera 110, fixed position camera 120, PTZ camera 130, and slave camera 140 communicate with router 150 using a wired connection (e.g., a LAN connection) or a wireless connection. Router 150 communicates with a computing system, such as host computer system 160. Router 150 communicates with host computer system 160 using either a wired connection, such as a local area network connection, or a wireless connection. In some configurations, instead of host computer system 160, the computing system may be a distributed computer system.

Fixed position camera 110 may be set in a fixed position, such as mounted to the eaves of a building to capture a video feed of the building's emergency exit. The field of view of such a fixed position camera, unless moved or adjusted by some external force, will remain unchanged. Fixed position camera 110 includes digital signal processor (DSP) 112 and video compressor 114. As frames of the field of view of fixed position camera 110 are captured by fixed position camera 110, these frames are processed by digital signal processor 112 to determine if one or more moving objects are present. To determine if one or more moving objects are present, processing is performed on the frames captured by the fixed position camera 110. This processing is described in detail in a patent application entitled "Searching Recorded Video" incorporated in the cross-reference section of this application. In short, a Gaussian mixture model is used to separate a foreground that contains images of moving objects from a background that contains images of static objects, such as trees, buildings, and roads. The images of these moving objects are then processed to identify various characteristics of the images of the moving objects.

Using the images of the moving objects, fixed position camera 110 creates metadata associated with the images of each moving object. Metadata associated with, or linked to, an object contains information regarding various characteristics of the images of the object. For instance, the metadata includes information on characteristics such as: a location of the object, a height of the object, a width of the object, the direction the object is moving in, the speed the object is moving at, a color of the object, and/or a categorical classification of the object. Metadata may also include information regarding events involving moving objects.

Referring to the location of the object, the location of the object in the metadata is expressed as two-dimensional coordinates in a two-dimensional coordinate system associated with fixed position camera 110. Therefore, these two-dimensional coordinates are associated with the position of the image of the object in the frames captured by fixed position camera 110. The two-dimensional coordinates of the object may be determined to be a point within the frames captured by the fixed position camera 110. In some configurations, the coordinates of the position of the object is determined to be the middle of the lowest portion of the object (e.g., if the object is a person standing up, the position would be between the person's feet). The two-dimensional coordinates have an x and y component, but no z component. In some configurations, the x and y components are measured in numbers of pixels. For example, a location of {613, 427} would mean that the middle of the lowest portion of the object is 613 pixels along the x-axis and 427 pixels along the y-axis of the field of view of fixed position camera 110. As the object moves, the coordinates associated with the location of the object would change. Further, because this coordinate system is associated with fixed position camera 110, if the same object is also visible in the fields of views of one or more other cameras, the location coordinates of the object determined by the other cameras would likely be different.

The height of the object may also be contained in the metadata and expressed in terms of numbers of pixels. The height of the object is defined as the number of pixels from the bottom of the image of the object to the top of the image of the object. As such, if the object is close to fixed position camera 110, the measured height would be greater than if the object is further from fixed position camera 110. Similarly, the width of the object is expressed in a number of pixels. The width of the objects can be determined based on the average width of the object or the width at the object's widest point that is laterally present in the image of the object. Similarly, the speed and direction of the object can also be measured in pixels.

The metadata determined by fixed position camera 110 is transmitted to host computer system 160 via a router 150. In addition to transmitting metadata to host computer system 160, fixed position camera 110 transmits a video feed of frames to host computer system 160. Frames captured by fixed position camera 110 can be compressed by video compressor 114 or can be uncompressed. Following compression, the frames are transmitted via router 150 to host computer system 160.

Fixed position camera 120 functions substantially similar to fixed position camera 110. Fixed position camera 120 also includes a digital signal processor and a video compressor (neither of which are illustrated in FIG. 1). Fixed position camera 120, assuming it is located in a position different from fixed position camera 110, has a different point of view and field of view. In the metadata transmitted to host computer system 160 by fixed position camera 120, locations of objects are expressed in two-dimensional coordinates of a two-dimensional coordinate system associated with fixed position camera 120. Therefore, because fixed position camera 110 and fixed position camera 120 are in different locations and each use their own two-dimensional coordinate system, even if the same object is observed at the same instant in time, the two-dimensional location coordinates, width measurements, and height measurements would vary from each other. As with fixed position camera 110, fixed position camera 120 transmits metadata and its frames of the video feed to host computer system 160 via router 150.

Security camera network 100 also includes a PTZ camera 130. PTZ camera 130 may pan, tilt, and zoom. As with fixed position camera 110 and fixed position camera 120, PTZ camera 130 includes a digital signal processor and a video compressor (not illustrated). In order for PTZ camera 130 to identify moving objects, PTZ camera 130 may have predefined points of view at which PTZ camera 130 has analyzed the background and can distinguish the foreground containing moving objects from the background containing static objects. A user using host computer system 160, may be able to control the movement and zoom of PTZ camera 130. Commands to control PTZ camera 130 may be routed from host computer system 160 to PTZ camera 130 via router 150. In some configurations, PTZ camera 130 follows a set pan, tilt, and zoom pattern unless interrupted by a command from host computer system 160.

Slave camera 140 may communicate with host computer system 160 via router 150. Slave camera 140 can either be a fixed position camera or a PTZ camera. Slave camera 140 is not capable of creating and determining metadata. Slave camera 140 can have a video compressor. Slave camera 140 transmits either raw frames of video feed, or compressed frames of the video feed, to host computer system 160 via router 150. Host computer system 160 processes frames received from slave camera 140 to create metadata associated with moving objects in the frames received from slave camera 140.

Host computer system 160 includes a metadata server 162, a video server 164, and a user terminal 166. Metadata server 162 receives, stores, and analyzes metadata received from the cameras communicating with host computer system 160. The processing of metadata by metadata server 162 is described in detail in relation to FIGS. 5-7. Video server 164 receives and stores compressed and/or uncompressed video from the cameras host computer system 160 is in communication with. User terminal 166 allows a user, such as a security guard, to interact with the metadata and the frames of the video feeds received from the cameras. User terminal 166 can display one or more video feeds to the user at one time. The user can select an object to track using user terminal 166. For example, if the user is viewing frames of the video feed from fixed position camera 110 and an object the user wishes to track appears in the field of view of fixed position camera 110, the user can select the image of the object. Host computer system 160 then tracks the object as it moves between the fields of view of fixed position camera 110, fixed position camera 120, PTZ camera 130, and slave camera 140. If the object is visible in the fields of view of multiple cameras, a preferable field of view is selected by the host computer system based on predefined rules. The user can also control PTZ camera 130 using user terminal 166.

In some configurations, the functions of metadata server 162, video server 164, and user terminal 166 are performed by separate computer systems. In other configurations, these functions may be performed by one computer system. For example, one computer system may process and store metadata, video, and function as the user terminal.

Figure 2:
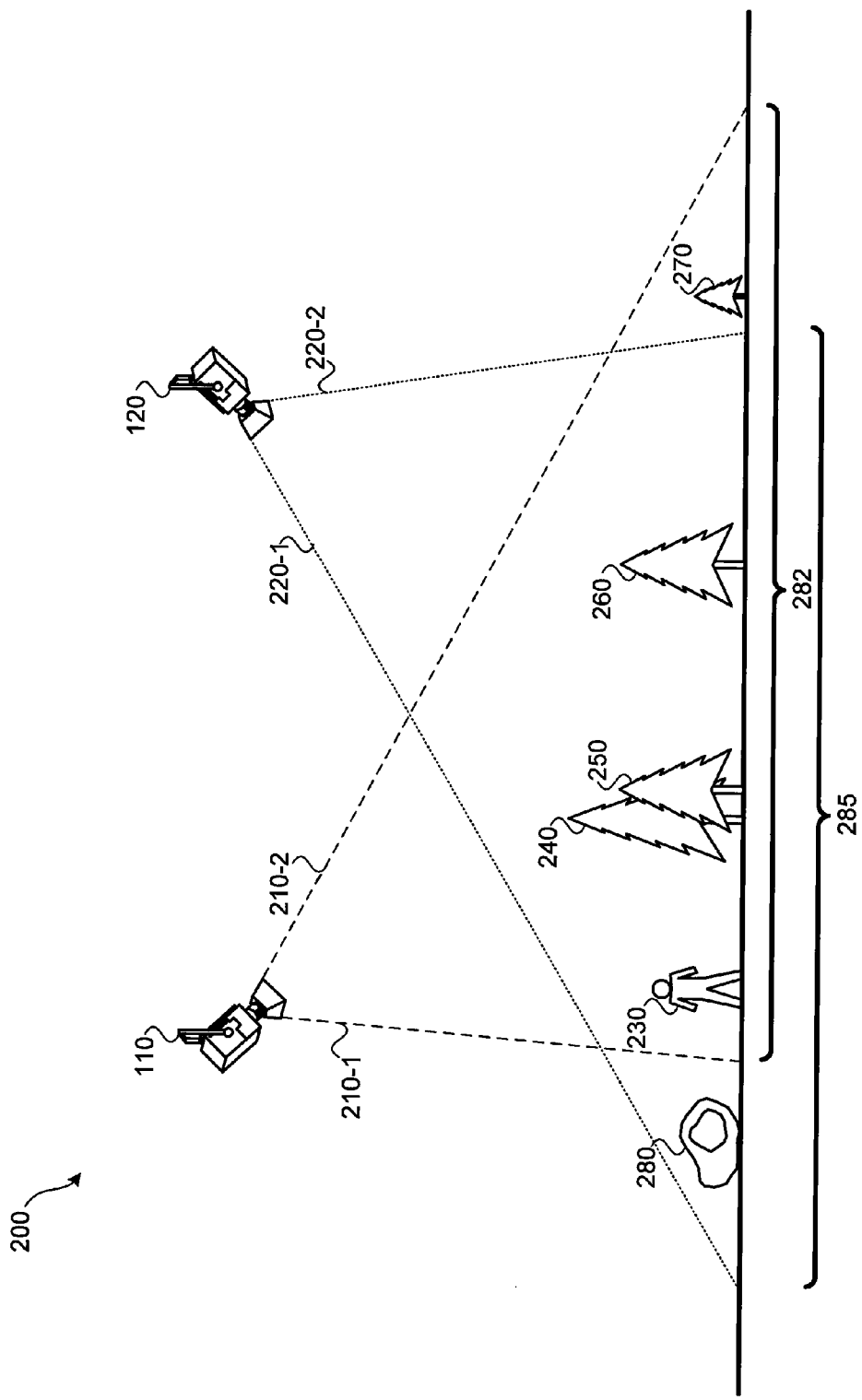
FIG. 2 illustrates a perspective view of an embodiment of a security camera network monitoring a region.

FIG. 2 illustrates a simplified view of an embodiment 200 of a security camera network monitoring an area. The security camera network of embodiment 200 contains two security cameras: fixed position camera 110 and fixed position camera 120. Fixed position camera 110 has a field of view illustrated by dotted lines 210-1 and 210-2. As such, objects within dotted lines 210 are visible (unless obscured by another object). Similarly, fixed position camera 120 has a field of view illustrated by guidelines 220-1 and 220-2. As illustrated, some objects are in the field of view of both fixed position cameras 110 and 120. However, other objects are only visible to either fixed position camera 110 or fixed position camera 120.

The field of view of fixed position camera 110 covers region 282. In the field of view of fixed position camera 110 several static objects are present. These static objects present in the field of view of fixed position camera 110 include tree 240, tree 250, tree 260, and shrub 270. Within the field of view of fixed position camera 110, one moving object is present: person 230. The field of view of fixed position camera 120 covers region 285. In the field of view of fixed position camera 120 static objects tree 240, tree 250, tree 260, and boulder 280 are present. The field of view of fixed position camera 120 also includes person 230.

Figure 3:
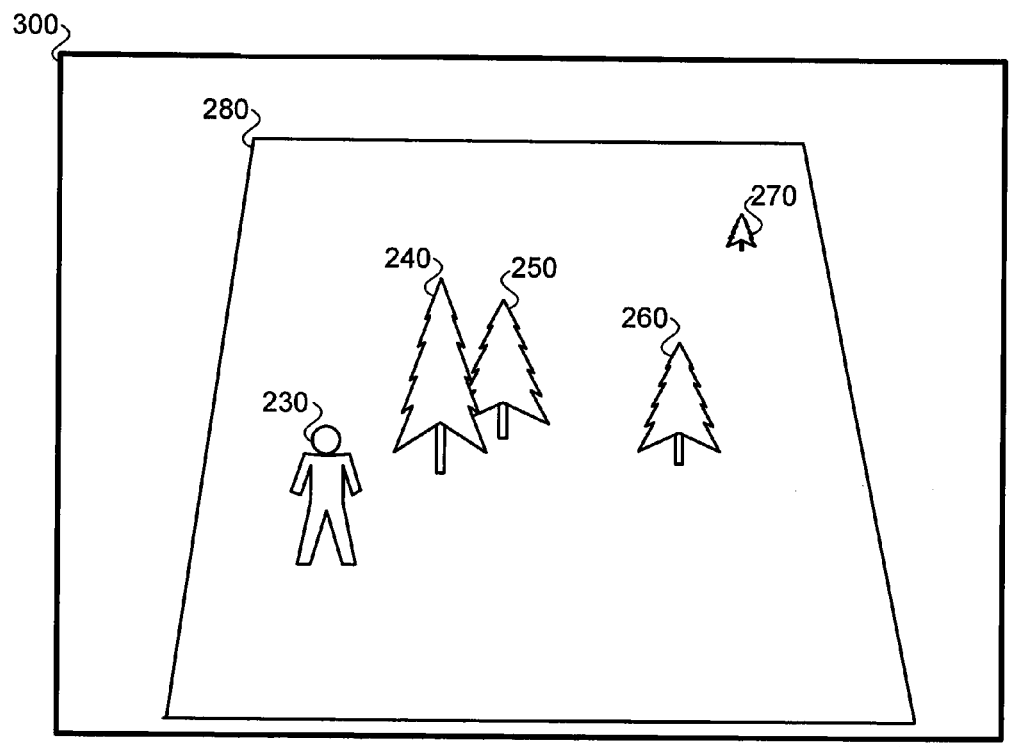
FIG. 3 illustrates an embodiment of a frame captured by a security camera.
Figure 4:
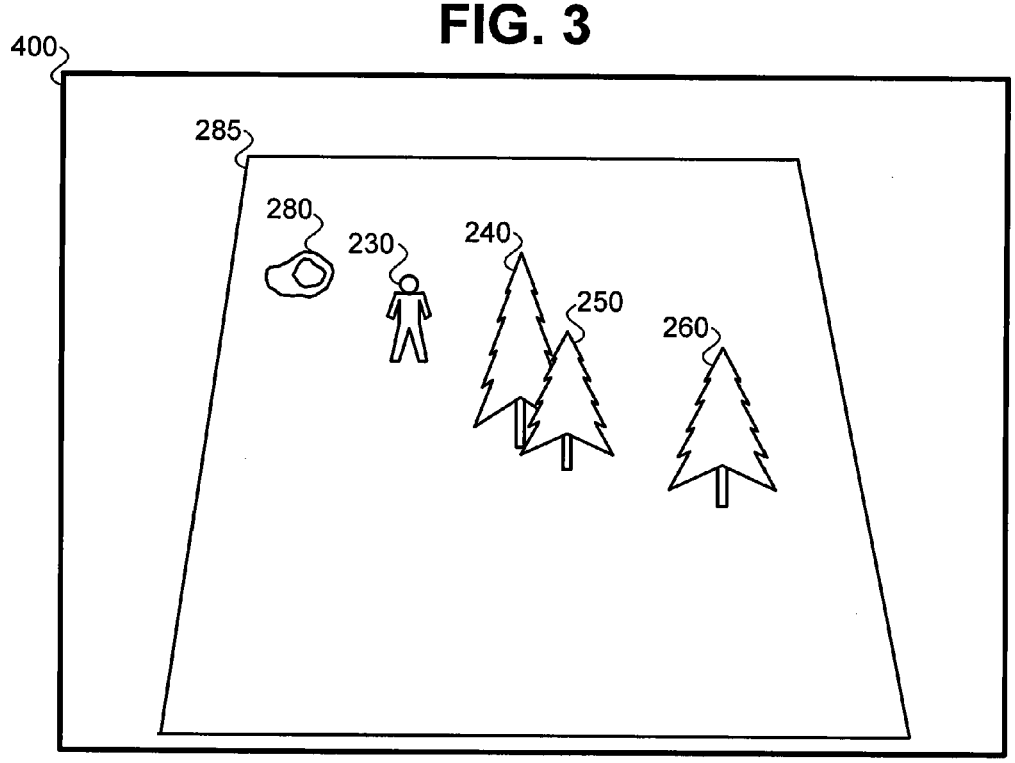
FIG. 4 illustrates an embodiment of another frame captured by a security camera.

FIGS. 3 and 4 illustrate configurations 300 and 400 of frames captured as part of video feeds by security cameras 110 and 120, respectively. Referring first to embodiment 300 of FIG. 3, the static objects and moving objects present in region 282 of FIG. 2 are illustrated from the point of view of fixed position camera 110 as the objects would be captured in a frame of a video feed. The objects present are person 230, tree 240, tree 250, tree 260, and shrub 270. Referring to embodiment 400 of FIG. 4, the static objects and moving objects present in region 285 of FIG. 2 are illustrated from the point of view of fixed position camera 120. The objects present here are person 230, tree 240, tree 250, tree 260, and boulder 280. As can be seen through comparison of configurations 300 and 400, person 230 appears in both the field of view of fixed position camera 110 and fixed position camera 120. Therefore, as person 230 moves, fixed position camera 110 and fixed position camera 120 create metadata linked to the images of person 230.

In reference to embodiment 300 of FIG. 3, metadata based on images of person 230 may identify various characteristics of the images of person 230, including a location in terms of a two-dimensional coordinate system associated with fixed position camera 110. Similarly, in reference to embodiment 400 of FIG. 4, metadata based on images of person 230 captured by fixed position camera 120 may identify various characteristics of the images of person 230 including a location in terms of the two-dimensional coordinate system associated with fixed position camera 120. Assuming the lower left corner of a frame captured from each fixed position camera's point of view is treated as the origin of each camera's respective coordinate system, the position coordinates of person 230 in embodiment 400 may have a greater x value and a greater y value than the position coordinate of person 230 in embodiment 300 because person 230 is located further to the right and further up in embodiment 400 than person 230 in embodiment 300. However, images of person 230 of embodiment 300 may have a greater height measurement and a greater width measurement because person 230 of embodiment 300 is closer to fixed position camera 110 than person 230 of embodiment 400 is to fixed position camera 120.

The frame of embodiment 300, and the metadata associated with person 230, may be transmitted by fixed position camera 110 to a host computer system. Similarly, referring to embodiment 400 of FIG. 4, metadata associated with person 230, along with the frame of embodiment 400, may be transmitted to the host computer system. Once the metadata from fixed position camera 110 and fixed position camera 120 has been received by the host computer system, the host computer system may process each set of metadata to determine whether the images of person 230 captured by fixed position camera 110 represent the same moving object as the images of person 230 captured by fixed position camera 120. The metadata may be processed in accordance with the methods described in FIGS. 6 and 7.

Figure 5A:
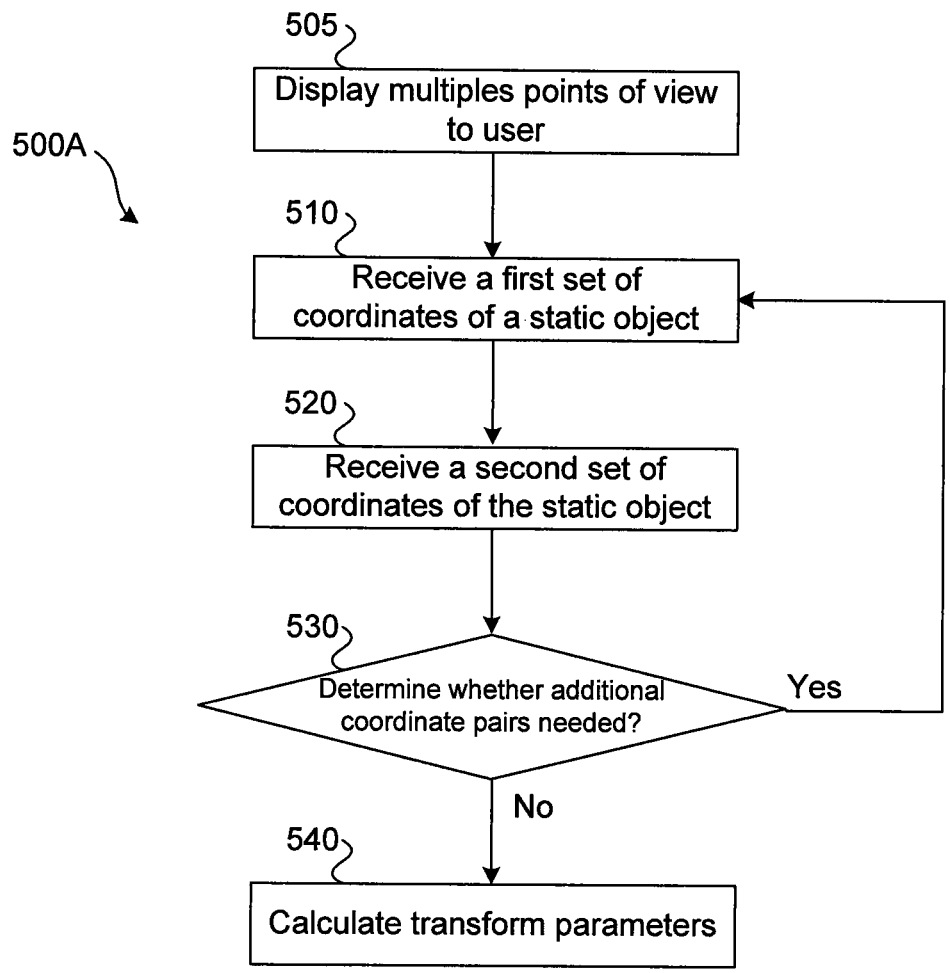
FIG. 5A illustrates an embodiment of a method for calibrating fixed cameras of a security camera network.

Prior to a host computer system determining whether an image captured of a moving object by one camera represents the same moving object as an image of a moving object captured by another camera, the cameras need to be calibrated. Such calibration provides the host computer system with one or more reference points that are known to be in the same (or approximately the same) physical location in fields of view of multiple cameras. FIG. 5A illustrates an embodiment of a method 500A for calibrating such cameras of a security camera network. For example, method 500A may be used to calibrate fixed position camera 110 and fixed position camera 120 with host computer system 160 of FIGS. 1 and 2.

At stage 505, frames from multiple different cameras may be displayed to a user, such as via user terminal 166 of FIG. 1. At stage 510, a first set of two-dimensional coordinates is received by the host computer system. These coordinates are provided by the user via a user terminal. A pair of coordinates may be determined based on the user clicking on a point in one or more frames received from a camera, such as a point in a frame that represents a base of an object (in some configurations, a point in space or a location within the frame is used). The user may also click on the top of the object to provide another pair of coordinates. This provides the host computer system with the height of the image of the object. At stage 520, a second set of coordinates may be received by the host computer system from the user. This set of coordinates may also be determined by the user clicking on one point in one or more frames captured by a second camera. The points selected by the user in the frames captured by the first camera should correspond (at least approximately) to the points selected by the user in the frames captured by the second camera. Therefore, the user would click on the base and top of the same object as was done at stage 510. Therefore, the host computer system, based on the points selected by the user, learns a location in the field of view of the first camera that corresponds to a location in the field of view of the second camera.

As an example, a user clicks on an easily identified static object in the frame captured by the first camera and the frame captured by the second camera, such as a mailbox. In this example, the user clicks on the base of the mailbox and the top of the mailbox in the frames from each camera. As such, the host computer system is provided with the height of the mailbox in each camera's point of view, and the location of the mailbox in each camera's point of view. Rather than displaying a single frame from each camera to the user, the video feed from each camera may be displayed to the user. The user can then click on various static objects to calibrate the camera network.

At stage 530, a determination is made as to whether additional coordinates are desired from the user. In some configurations (here implementations), coordinates corresponding to at least three objects are used by the host computer system. If coordinates of less than three objects have been received, the method returns to stage 510. Otherwise, transform parameters are calculated by the host computer system at stage 540. In order to calculate the transform parameters, a three-dimensional perspective transform is applied. In some configurations, a least square method is used for parameter estimation. Using this approach, the size of an object appearing in the field of view of one camera can be used to estimate the size of the object in another camera's field of view. Once calculated, these transform parameters allow for two-dimensional coordinates received from cameras to be converted into a global three-dimension coordinate system consisting of an x, y, and z component. This global three-dimensional coordinate system does not vary from camera to camera, rather, the global three-dimensional coordinate system is maintained by the host computer system.

In some configurations, one or more cameras are calibrated with an overhead map (which may have a predefined scale) of an area being monitored. For example, a static object visible in the field of view of a camera may be selected by a user (for the first set of coordinates), the second set of coordinates may be selected by the user on the overhead map. Using such an overhead map removes the need for camera pairs to be configured one-by-one; rather, each camera can be calibrated with the overhead map. Following calibration with the overhead map, the coordinates of moving objects received from cameras are mapped to the overhead map. Since such a transform may be linear, the locations determined using the global coordinate system. Whether using an overhead map or calibration of camera pairs, once calibrated, a security camera system can be used to track moving objects.

Figure 5B:
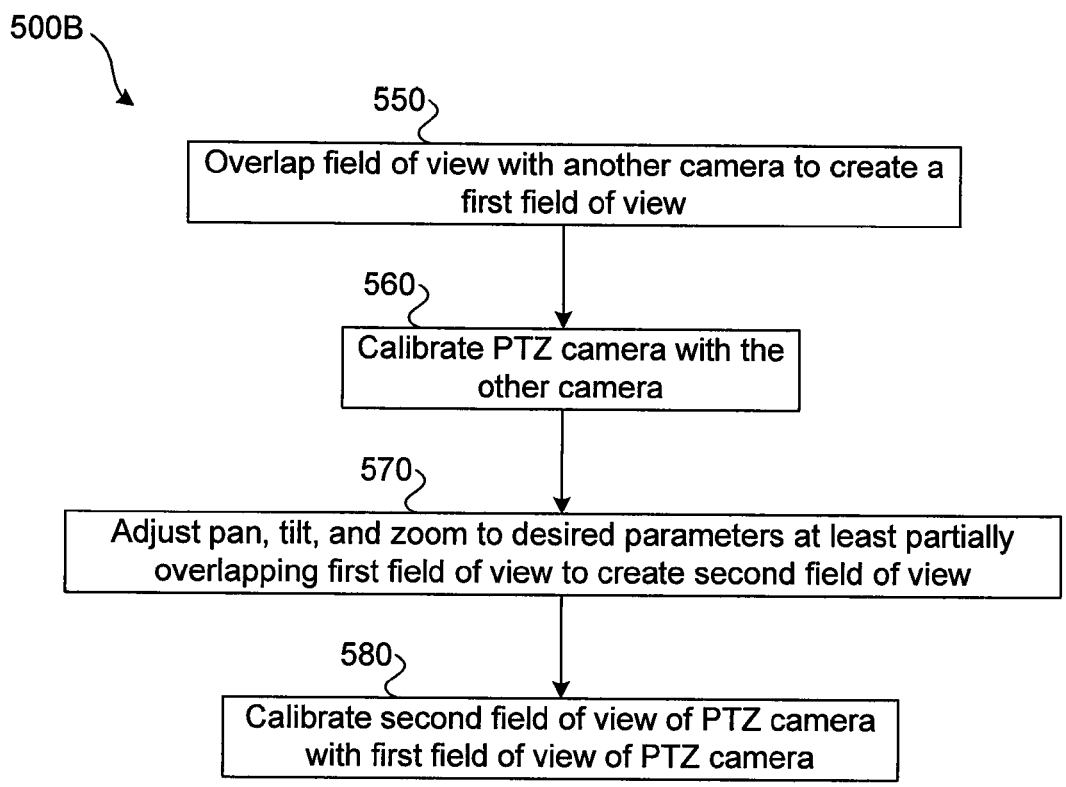
FIG. 5B illustrates an embodiment of a method for calibrating PTZ cameras of a security camera network.

While method 500A details calibration of fixed security cameras, FIG. 5B illustrates an embodiment of a method 500B for calibrating a PTZ camera. At stage 550, a field of view of a PTZ camera is adjusted to overlap, roughly as much as possible, a field of view of a fixed camera that creates metadata. This is accomplished by adjusting the pan, tilt, and zoom parameters of the PTZ camera. At stage 560, the PTZ camera, as positioned to view the first field of view that overlaps the field of view of the camera creating metadata, is calibrated with the field of view of the camera creating metadata. This calibration process proceeds as detailed in method 500A for two fixed security cameras. This calibration process results in the creation of a first set of calibration parameters that defines, among other parameters, the pan, tilt, and zoom of the PTZ camera, referred to here as "CALIBPARAMSET1."

CALIBPARAMSET1 can be a perspective transform which converts coordinates (x, y, z) from the coordinate system of the fixed camera to the coordinate system of the PTZ camera. The 3D perspective transform can be written as expressed in equation 1.

$$\begin{bmatrix} X \\ Y \\ Z \\ W \end{bmatrix} = A \begin{bmatrix} x \\ y \\ z \\ 1 \end{bmatrix} \quad \text{Eq. 1}$$

Where A is a transform matrix with its coefficients being the parameters used to estimate location using the least squares fitting method according to equation 2 and W is a normalization parameter.

$$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \quad \text{Eq. 2}$$

At stage 570, the pan, tilt, and zoom parameters of the PTZ camera are calibrated. To do this, the user selects a point in the field of view of the fixed camera (which is visible in the field of view of the PTZ camera while in the CALBPARAMSET1 configuration). The pan, tilt, and zoom of the PTZ camera is then adjusted to center its point-of-view on this point. At stage 580, the pan, tilt, and zoom parameters are stored for this position. At stage 585, stages 570 and 580 are repeated a number of times, such as four times, as needed to collect sufficient data to calibrate the PTZ camera. At stage 590, the transform parameters are calculated based on the pan and tilt and zoom parameters and the location of the points. This results in the creation of a second set of calibration parameters, referred to as "CALIBPARAMSET2."

CALIBPARAMSET2, may be as described in equations 3 and 4, and may be used to convert (x, y) coordinates to the pan and tilt values necessary to view the location described by the coordinates using the PTZ camera.

$$\begin{bmatrix} p \\ t \\ w \end{bmatrix} = B \begin{bmatrix} x \\ y \\ 1 \end{bmatrix} \quad \text{Eq. 3}$$

$$B = \begin{bmatrix} b_{11} & b_{12} & b_{13} \\ b_{21} & b_{22} & b_{23} \\ b_{31} & b_{13} & b_{33} \end{bmatrix} \quad \text{Eq. 4}$$

At stage 595, the zoom parameters based on object size may be calculated. This may be accomplished by measuring two objects of the same size at different locations from the PTZ camera (e.g., near and far) within the PTZ camera's field of view. In some configurations, the same distance is measured at two different distances from the PTZ camera. For example, a 3-foot section of rope may be measured at two different distances from the PTZ camera. At one distance, the rope may be measured to be 20 pixels in length, but only 7 pixels when father from the PTZ camera. Based on this calibration, a third set of calibration parameters, referred to here as "CALIBPARAMSET3" is created. This parameter set may be used to determine the amount of zoom the PTZ camera should use when tracking an object. In some configurations, CALIBPARAMSET3 is a lookup table that relates object size to where in an image captured by the PTZ camera the object appears. For example, based on the width or height in pixels and the location within an image, the physical size of an object can be determined.

Therefore, when a camera that was calibrated with the PTZ camera at stage 560 is tracking an object, a metadata processing server that receives metadata from the camera and calculates the moving object's location in the field of view of the PTZ camera. CALIBPARAMSET1 is used to calculate the location and size of the object in the field of view of the PTZ camera when the PTZ camera is in the position (e.g., same pan, tilt, and zoom parameters) having the first field of view used during calibration at stage 560. CALIBPARAMSET2 is used to calculated the pan and tilt values of the PTZ camera to track the moving object. CALIBPARAMSET3 is used to determine an amount of zoom for the PTZ camera to use to track the moving object.

Figure 6:
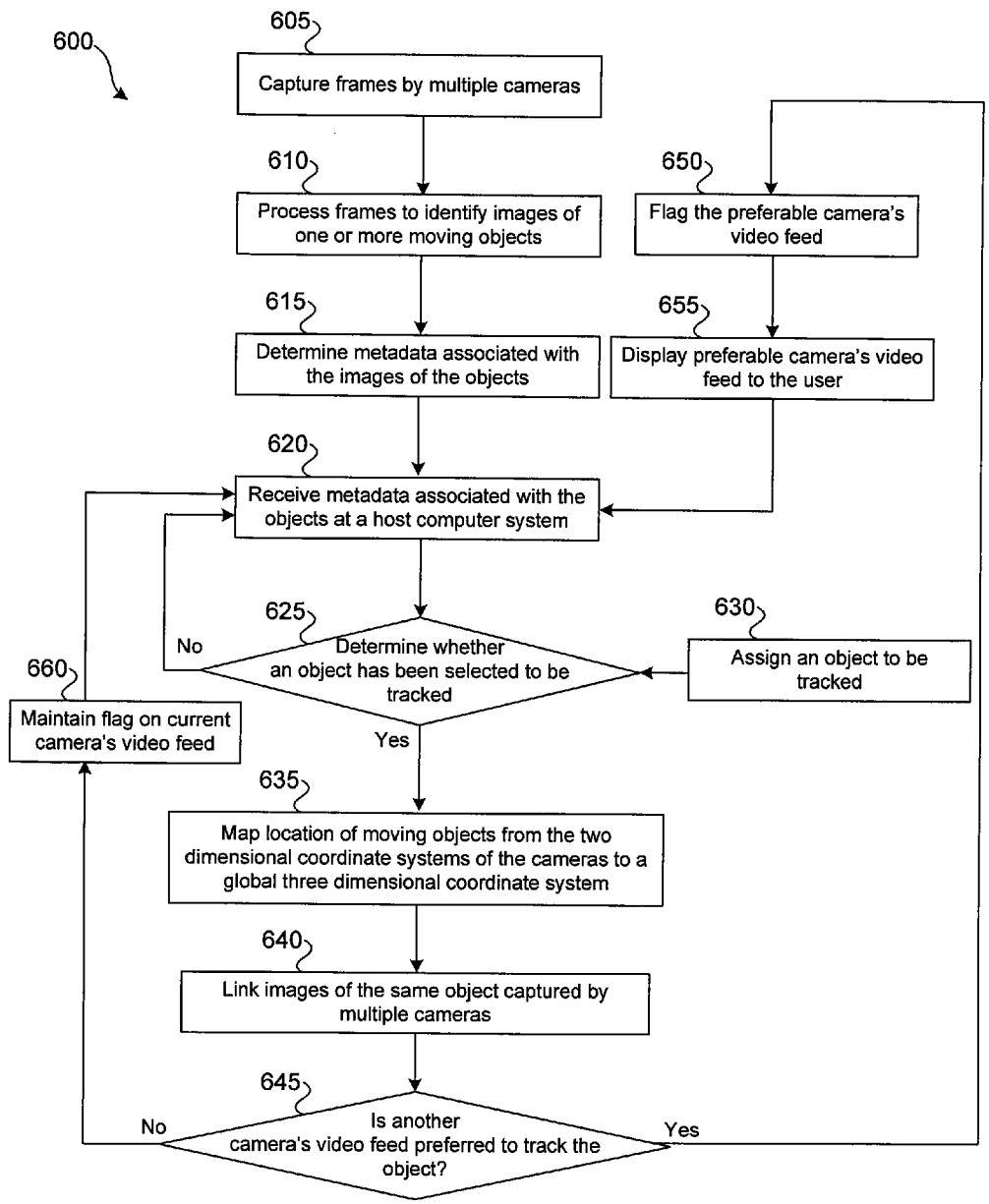
FIG. 6 illustrates an embodiment of a method for tracking an object using video feeds from multiple security cameras.

FIG. 6 illustrates an embodiment of a method 600 for tracking an object using video feeds from multiple security cameras (e.g., including fixed position cameras, slave cameras, and/or PTZ cameras). At stage 605, frames are captured by multiple different cameras, such as camera 110 and 120 of FIGS. 1 and 2. The fields of view of the multiple cameras overlap. Using static objects appearing in the overlap region of each camera's field of view, the cameras may have been calibrated according to method 500A. At stage 610, the frames captured by each camera are processed to identify what, if any, moving objects are present in the frames. This process, as previously described, involves separating a foreground region containing moving objects from a background region containing static objects. This processing is performed by the camera. If the camera is a slave camera, the processing is performed by a host computer system. For the remainder of method 600, it is assumed that two cameras are being used and one moving object has been detected in the overlap region by both cameras. However, in other configurations, more cameras may be present and more than one moving object may be present and detected.

At stage 615, each of the cameras creates metadata associated with the images of the moving object. This metadata may include a position of the object in a two-dimensional coordinate system specific to the camera that has detected the moving object. The two-dimensional coordinate system may be measured in pixels of the camera's CCD. Metadata created by the camera includes a height of the image of the object and/or a width of the image of the object. The height and width of the image of the object is measured in pixels of the camera's CCD. The metadata also includes a date and/or time. The metadata further includes an identifier that specifies the camera capturing the image of the moving object. The metadata also includes an identifier that has been assigned by the camera to the moving object. Moreover, the metadata includes a direction, a color associated with the moving object, and/or a speed of the object. Based on the height, width, and shape of the moving object, the object may be classified into a category based on a comparison with a profile of a category of object. For example, moving objects that are twice as wide as tall may be categorized as a vehicle. The category associated with the moving object is also included in the metadata transmitted by each camera to the host computer system. At stage 620, metadata (regarding objects and events) is received by the host computer system from the multiple cameras. This metadata is analyzed and stored by the host computer system.

At stage 625, it is determined whether an object has been selected to be tracked by a user or a predefined rule. If the answer is no, method 600 returns to stage 625 and continues receiving and storing metadata until an object has been selected. In some configurations, if a moving object is detected, the host computer system automatically selects the moving object. If multiple moving objects are present, the host computer system may automatically select the largest or fastest moving object. In some configurations, the moving object closest to an area designated as sensitive may be selected. In some configurations, if an object touches a trip wire or zone of interest, the object is tracked automatically.

At stage 630, a user, such as a security guard, may select a moving object to be tracked. In some configurations, the user selects an object to be tracked by clicking on an image of the object using a user terminal. Once an object has been selected to be tracked, a tracking token is linked to the object. This object is now be tracked by the security camera network until the user unselects the moving object, selects another moving object, and/or the moving object leaves the fields of view of the cameras for a threshold period of time.

At stage 635, Assuming that the moving object selected to be tracked is present in the field of view of two cameras, and associated metadata has been created based on images of the moving object created by both cameras, the location information of each image of the object may be mapped from the two-dimensional coordinate system linked to the camera that captured the image of the object to the global three-dimensional coordinate system using the transform parameters calculated at stage 540 of FIG. 5. When the two-dimensional coordinates of the moving object are mapped to the global three-dimensional coordinate system, each set of two-dimensional coordinates of the object should map to the same, or approximately the same, coordinates in the three-dimensional coordinate system.

At stage 640, instances of the same object captured by multiple cameras are linked. To determine whether images of objects represent the same object, the metadata and the mapped location of the objects in the three-dimensional coordinate system are used. Objects with the same, or approximately the same, three-dimensional coordinates may be determined to be the same object. If two instances of images of objects are determined to belong to the same object, the host computer system links the instances.

Figure 7:
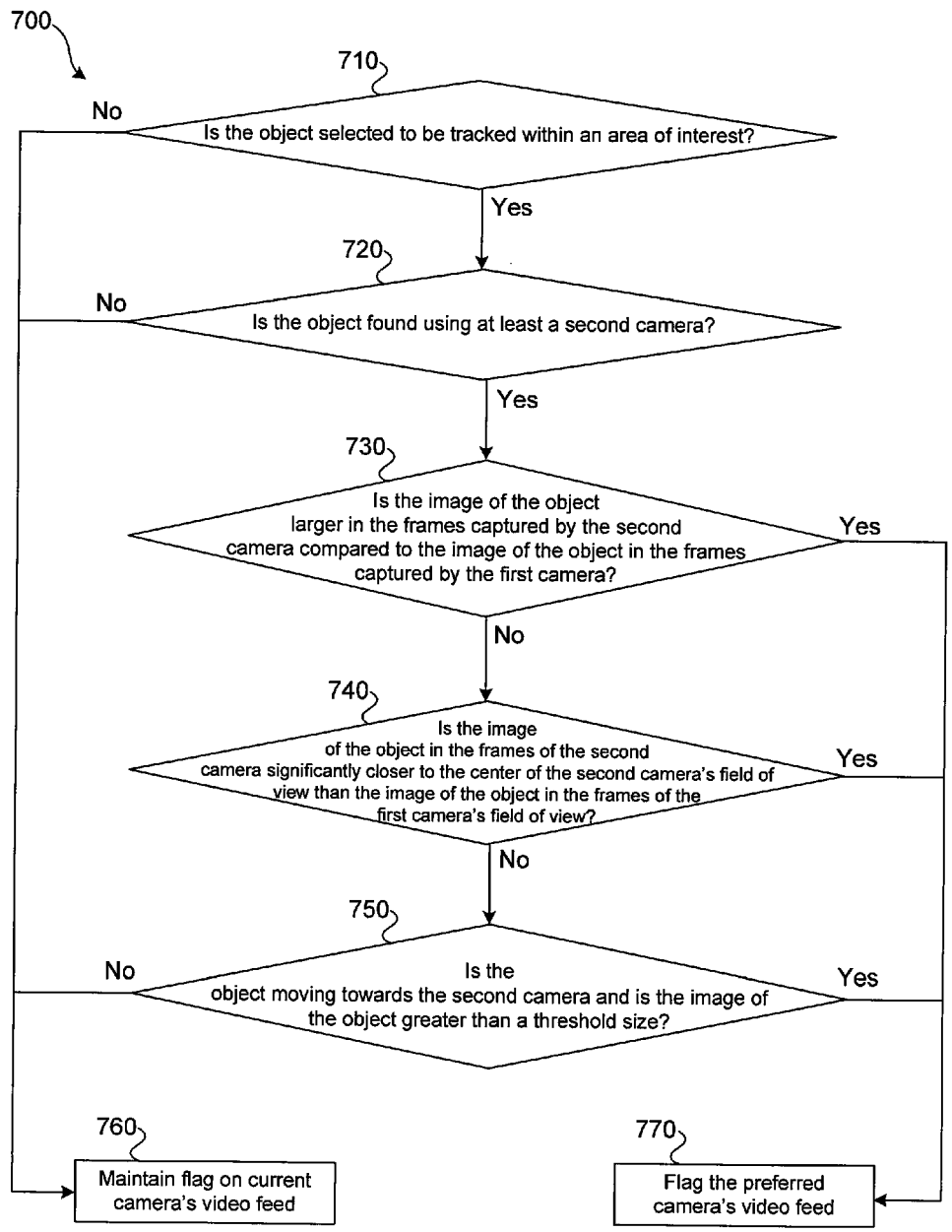
FIG. 7 illustrates an embodiment of a method for determining whether to handoff display of video from a first security camera's feed to a second security camera's feed.

At stage 645, the host computer system determines whether the video feed from one of the cameras of the moving object not currently being displayed to the user is preferable over the video feed from the camera currently being used to display the moving object to the user. Method 700 of FIG. 7 is an embodiment of a method that is used to determine which video feed of the moving object is preferable to display to the user. If the current video feed remains the preferable video feed, the flag is maintained on the current camera's video feed at stage 660 and method 600 returns to stage 620. This also occurs if the object being tracked is only in the field of view of one camera. If another camera's video feed is determined more suitable to use to track the object, the method proceeds to stage 650. Also, if the current video feed has only recently become the preferable video feed, a threshold amount of time may be required to pass before another video feed can be selected as the preferable video feed. Such a threshold time may prevent the video feed that is presented to the user from changing rapidly between points of view of different cameras.

At stage 650, the preferable camera's video feed is flagged. Flagging the preferable camera's video feed is also referred to as associating a token with the preferable camera's video feed. At stage 655, the video feed that is flagged or is associated with the token is displayed to the user. Therefore, the video feed of the preferable camera is displayed to the user. Method 600 returns to stage 620 and continues. In some configurations, an indicator is displayed to the user that indicates which camera's video feed is being displayed.

Referring again to stage 645, a more detailed evaluation process is followed to determine which camera's video feed is preferable. FIG. 7 illustrates an embodiment of a method 700 for determining whether to switch display of a first security camera's feed to a second security camera's feed. Method 700 may be performed by the host computer system. More specifically, method 700 may be performed by a metadata server, such as metadata server 162 of FIG. 1. For purposes of explaining method 700, it is assumed that a video feed from a first camera is initially flagged for display. For example, the video feed of this first camera may be the video feed in which the user initially selected the moving object to be tracked.

At stage 710, the host computer system evaluates whether the object selected to be tracked is within an area of interest. An area of interest may refer to an area, within the field of view of a camera, where a moving object is of importance. In some configurations, the entire field of view of the camera may be the area of interest. However, in other configurations, only part of the field of view may be an area of interest. Consider the following example: a security camera's field of view includes a lawn, a sidewalk, and a fence separating the lawn from the sidewalk. If moving objects travel along the sidewalk, this may be of little or no interest to security personnel. However, if a person climbs the fence and walks on the lawn, this person may need to be monitored and tracked. In this case, the area of interest is set to be the lawn, but excludes the sidewalk. Therefore, at stage 710, if the object selected to be tracked is outside of an area of interest, the method proceeds to stage 760 and the current camera's video feed remains flagged for display to the user. Stage 760 represents the same step as stage 660 of FIG. 6.

At stage 720, if only one camera has the moving object within its field of view, the method proceeds to stage 760 and the current camera's video feed remains flagged for display to the user. Using the metadata, if one or more additional cameras have been determined to have the object being tracked within their fields of view, method 700 proceeds to stage 730.

At stage 730, if the object being tracked appears significantly larger in frames captured by the second camera than the first camera, the method proceeds to stage 770 and the video feed of the second camera is flagged for display to the user at stage 770. To be clear, flagging the preferred camera's video feed at stage 770 represents the same step as flagging the preferred camera's video feed at stage 650 of FIG. 6. If the object being tracked does not appear significantly larger in the video feed of the second camera, method 700 proceeds to stage 740. To determine whether the size of the object being tracked appears significantly larger, the height and width of the object as identified in the metadata received from each camera is used. In some configurations, the height and width are multiplied to determine an area of the image of the moving object as recorded by each camera. To determine if the object is significantly larger in frames captured by the second camera, a threshold magnitude of change or threshold percentage may be used. For example, if the image of the object contains 100 more pixels in the video feed of the second camera, the second camera's video feed may be flagged. In some configurations, a percentage threshold may be used. For example, if the height, width, and/or area of the image of the object in the video feed of the second camera is more than 10% (or any other percentage) larger, the method may proceed to stage 770. If not, the method may proceed to stage 740. In some configurations, if the image of the object in the second video feed is not significantly larger than the image of the object in the first video feed, method 700 proceeds to stage 760.

At stage 740, if the image of the object is significantly closer to the center of the second camera's field of view than to the center of the first camera's field of view, method 700 proceeds to stage 770. If not, method 700 proceeds to stage 750. A distance to the center of each camera's field of view may be measured in pixels. Also, this distance may be part of the metadata transmitted to the host computer system by each camera. The distance may be measured from the location of the object as received in the metadata from each camera. To determine whether the object is significantly closer to the center of the second camera's field of view, a threshold value or percentage may be used to make the determination. For example, if the object is 100 pixels or 20% closer to the center of the field of view of the second camera, the method proceeds to stage 770. Otherwise, the method proceeds to stage 750.

At stage 750, if the object is determined to be moving towards the second camera, and the size of the image of the object is above a threshold value, method 700 proceeds to stage 770. Otherwise, the method may proceed to stage 760 and the video feed of the first camera may remain flagged. Whether the object is moving toward the second camera may be determined based on direction data included in the metadata transmitted by the cameras. In some configurations, either the camera or the host computer may determine the direction of the object by monitoring the change in the position of the object over a period of time. A threshold for the size of the image of the object may be set. For example, unless the object is at least some number of pixels in height, width, and/or area, method 700 proceeds to stage 760 regardless of whether the object is moving towards the second camera.

Following either stage 760 or stage 770 being performed, the first or second camera's video feed may be displayed to the user, and method 600 of FIG. 6 may continue with metadata being received by the host computer system from one or more cameras. While methods 600 and 700 focus on tracking one moving object, a user can select multiple moving objects to be tracked. In such an instance, these multiple objects may each be tracked, with multiple video feeds being presented (simultaneously) to the user.

Figure 8:
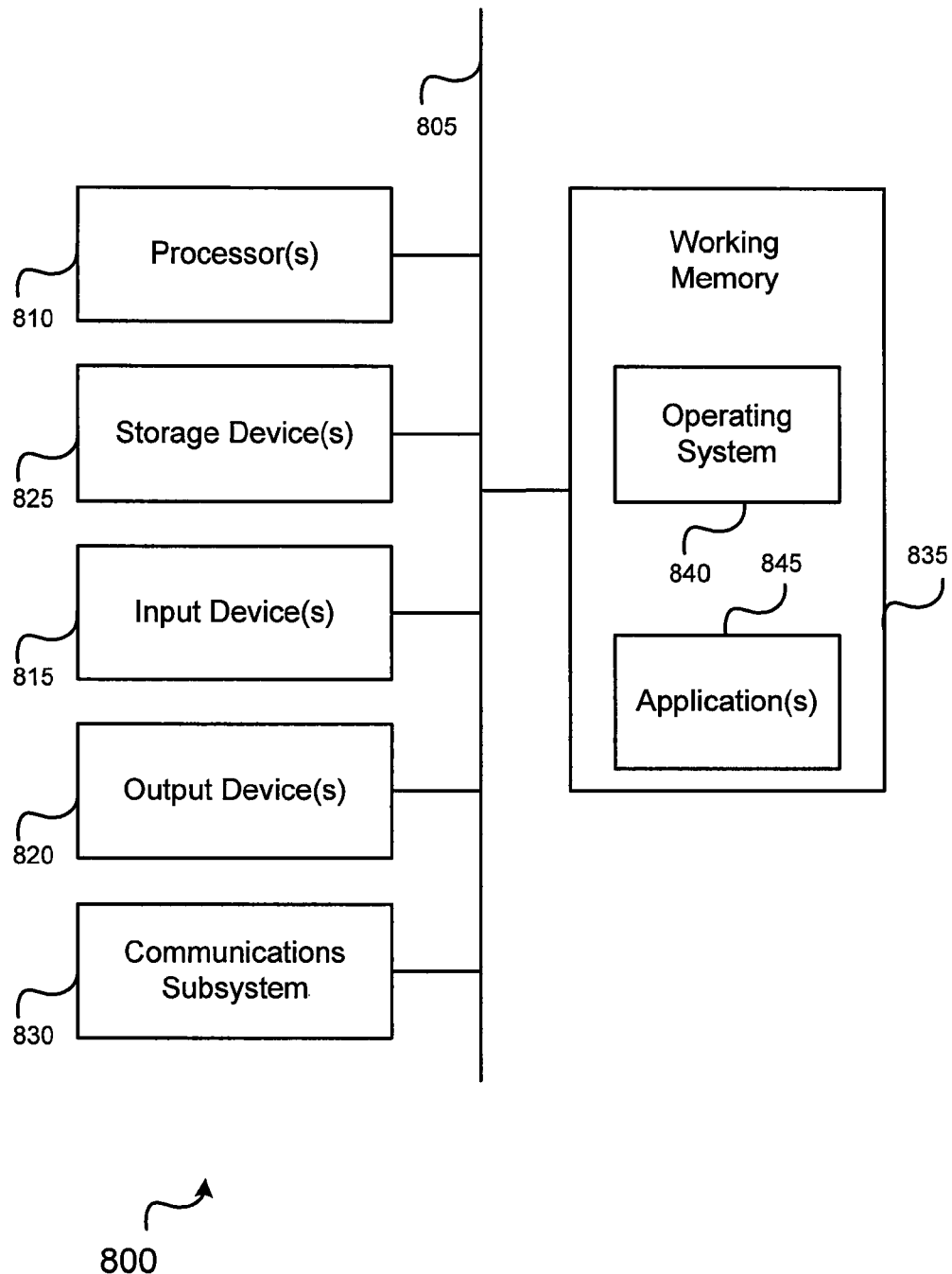
FIG. 8 illustrates a block diagram of an embodiment of a computer system.

To perform the actions of the host computer system, the metadata server, video server, the user terminal, or any other previously described computerized system, a computer system as illustrated in FIG. 8 may be used. FIG. 8 provides a schematic illustration of one embodiment of a computer system 800 that can perform the methods provided by various other configurations, as described herein, and/or can function as the host computer system, a remote kiosk/terminal, a point-of-sale device, a mobile device, and/or a computer system. FIG. 8 provides a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many configurations, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various configurations, and/or may be designed to implement methods, and/or configure systems, provided by other configurations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the system 800. In other configurations, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some configurations may employ a computer system (such as the computer system 800) to perform methods in accordance with various configurations of the invention. According to a set of configurations, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various configurations of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, the preceding description details security camera system. However, the systems and methods described herein may be applicable to other forms of camera systems.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for tracking an object with a plurality of cameras, the method comprising:
capturing, using a first camera, a first set of frames, wherein:
the plurality of cameras comprises the first camera;
the first set of frames comprises a first set of images of the object; and
the first set of frames is captured from a first point of view;
capturing, using a second camera, a second set of frames, wherein:
the plurality of cameras comprises the second camera;
the second set of frames comprises a second set of images of the object;
and
the second set of frames is captured from a second point of view;
calibrating the first camera and the second camera using a calibration process based on physical locations known to be within a field of view of both the first camera and the second camera;
determining, using the first camera, a presence of the object in the first set of frames;
linking, by the first camera, metadata to the presence of the object, wherein the metadata indicates at least one characteristic of the first set of images of the object;
transmitting the metadata from the first camera to a computing system; and
identifying, by the computing system, based at least in part on the metadata received from the first camera, that the second set of images captured by the second camera represents the same object as the object in the first set of images in the first set of frames; and
selecting, by the computing system, the first set of frames or the second set of frames for display to a user based on respective locations of the object in the first set of frames and the second set of frames relative to centers of fields of view of the first camera and the second camera, respectively.

2. The method of claim 1, wherein the selecting selects whichever of the first set of frames or the second set of frames has the object being closer to the respective center of the frames by at least a threshold amount.

3. The method of claim 2, wherein the selecting occurs substantially in real time, wherein real time refers to frames being displayed that represent a current location of the object.

4. The method of claim 2, wherein the selecting occurs at least an hour after the first set of frames and the second set of frames were captured.

5. The method of claim 2, wherein the selecting selects whichever of the first set of frames or the second set of frames has the object being larger.

6. The method of claim 1, further comprising receiving, by the computing system, a selection from the user, wherein the selection indicates to track the object using frames captured by the plurality of cameras.

7. The method of claim 1, wherein the at least one characteristic comprises two-dimensional coordinates of a location of the object in a two-dimensional coordinate system associated with the first camera.

8. The method of claim 7, further comprising converting, by the computing system, the two-dimensional coordinates of the location to three-dimensional coordinates.

9. The method of claim 1, wherein a first field of view associated with the first point of view and a second field of view associated with the second point of view at least partially overlap.

10. The method of claim 1 wherein a first field of view associated with the first point of view and a second field of view associated with the second point of view do not overlap.

11. The method of claim 1, further comprising:
receiving, by the computing system, a first set of coordinates that corresponds to a first location in a first field of view of the first camera;

receiving, by the computing system, a second set of coordinates that corresponds to the first location in a second field of view of the second camera; and mapping, by the computing system, using the first set of coordinates and the second set of coordinates, a first two-dimensional coordinate system linked with the first camera and a second two-dimensional coordinate system linked with the second camera to a three-dimensional coordinate system.

12. A system for identifying an object in frames captured by a plurality of cameras, the system comprising:
the plurality of cameras, wherein:
the plurality of cameras comprises a first camera and a second camera;
the first camera is configured to capture a first set of frames from a first point of view with a first field of view;
the first camera is configured to identify a first set of images of a first object in the first set of frames;
the first camera is configured to determine a first set of metadata associated with the first object in the first set of frames;
the second camera is configured to capture a second set of frames from a second point of view with a second field of view;
the second camera is configured to identify a second set of images of a second object in the second set of frames; and
the second camera is configured to determine a second set of metadata associated with the second object in the second set of frames; and
a host computer system configured to:
receive the first set of metadata from the first camera;
receive the second set of metadata from the second camera;
receive the first set of frames from the first camera;
receive the second set of frames from the second camera;
calibrate the first camera and the second camera using a calibration process based on physical locations known to be within a field of view of both the first camera and the second camera;
determine, based at least in part on the first set of metadata received from the first camera and the second set of metadata received from the second camera, that the first set of images of the first object and the second set of images of the second object represent the same object; and
select the first set of frames or the second set of frames for display to a user based on respective locations of the object in the first set of frames and the second set of frames relative to centers of fields of view of the first camera and the second camera, respectively.

13. The system of claim 12, wherein to select the first set of frames or the second set of frames the host computer system is configured to select whichever of the first set of frames or the second set of frames has the object being closer to the respective center of the frames by at least a threshold amount or whichever of the first set of frames or the second set of frames has the object being larger.

14. The system of claim 12, wherein the host computer system is further configured to receive a selection from the user, wherein the selection indicates to track the first object.

15. The system of claim 12, wherein:
the first set of metadata comprises two-dimensional coordinates of a location of the object in a first two-dimensional coordinate system associated with the first camera; and
the second set of metadata comprises two-dimensional coordinates of the location in a second two-dimensional coordinate system associated with the second camera.

16. The system of claim 12, wherein the first camera is further configured to segment a foreground of the first set of frames from a background of the first set of frames, wherein:
the background comprises a first set of objects that substantially are not moving;
the foreground comprises a second set of objects that are moving;
the second set of objects comprises the first object; and
the foreground is configured to be segmented from the background using a Gaussian mixture model.

17. The system of claim 12, further comprising:
a slave camera, wherein:
the slave camera is configured to capture a third set of frames; and
the slave camera is configured to transmit the third set of frames to the host computer system;
wherein the host computer system is further configured to determine metadata associated with a third object in the third set of frames.

18. An apparatus for tracking an object, the apparatus comprising:
a first means for capturing a first set of frames, wherein:
the first set of frames comprises a first set of images of an object; and
the first set of frames is captured from a first point of view with a first field of view;
a second means for capturing a second set of frames, wherein:
the second set of frames comprises a second set of images of the object; and
the second set of frames is captured from a second point of view with a second field of view;
a third means for identifying a presence of the object in the first set of frames;
a fourth means for determining metadata associated with the first set of images of the object, wherein the metadata indicates at least one characteristic of the first set of images of the object;
a fifth means for identifying, based at least in part on the metadata, that the second set of images comprises the same object as the first set of images;
sixth means for selecting the first set of frames or the second set of frames for display to a user based on respective locations of the object in the first set of frames and the second set of frames relative to centers of fields of view of the first means for capturing and the second means for capturing, respectively; and
a seventh means for calibrating the first means for capturing and the second means for capturing using a calibration process based on physical locations known to be within the field of view of both the first means for capturing and the second means for capturing.

19. The apparatus for tracking the object of claim 18, wherein the metadata comprises:
a height measurement of the first set of images of the object; and
a width measurement of the first set of images of the object.

20. The apparatus of claim 18, further comprising: an eighth means for receiving a selection from the user, wherein the selection indicates to track the object.

21. The apparatus of claim 18, wherein the metadata comprises two-dimensional coordinates of a location of the object in a two-dimensional coordinate system associated with the first means.

22. The apparatus of claim 18, wherein the sixth means are for selecting whichever of the first set of frames or the second set of frames has the object being closer to the respective center of the frames by at least a threshold amount or whichever of the first set of frames or the second set of frames has the object being larger.

23. The method of claim 1, where calibrating the first camera and the second camera using the calibration process based on the physical locations known to be within the field of view of both the first camera and the second camera further comprises:
- presenting a first frame captured by the first camera on a user interface;
- presenting a second frame captured by the second camera on the user interface;
- receiving a first input identifying a first location of a known object within the first frame;
- receiving a second input identifying a second location of the known object within the second frame; and
- generating a set of calibration parameters based on the first input and the second input.

* * * * *